United States Patent
Mumcuoglu et al.

(10) Patent No.: US 10,645,110 B2
(45) Date of Patent: *May 5, 2020

(54) AUTOMATED FORENSICS OF COMPUTER SYSTEMS USING BEHAVIORAL INTELLIGENCE

(71) Applicant: Palo Alto Networks Ltd., Tel Aviv (IL)

(72) Inventors: Michael Mumcuoglu, Jerusalem (IL); Giora Engel, Mevasseret-Zion (IL); Eyal Firstenberg, Ramat HaSharon (IL)

(73) Assignee: PALO ALTO NETWORKS (ISRAEL ANALYTICS) LTD., Tel Aviv (IL)

( * ) Notice: Subject to any disclaimer, the term of this patent is extended or adjusted under 35 U.S.C. 154(b) by 42 days.

This patent is subject to a terminal disclaimer.

(21) Appl. No.: 15/955,712

(22) Filed: Apr. 18, 2018

(65) Prior Publication Data

US 2018/0367556 A1 Dec. 20, 2018

Related U.S. Application Data

(60) Continuation of application No. 15/286,643, filed on Oct. 6, 2016, now Pat. No. 9,979,742, which is a (Continued)

(51) Int. Cl.
*H04L 29/06* (2006.01)
*G06F 21/55* (2013.01)
(Continued)

(52) U.S. Cl.
CPC ........ *H04L 63/1425* (2013.01); *G06F 21/552* (2013.01); *G06F 21/566* (2013.01);
(Continued)

(58) Field of Classification Search
CPC ............. H04L 63/1425; H04L 63/1441; H04L 63/0227; H04L 61/1511; H04L 63/1416;
(Continued)

(56) References Cited

U.S. PATENT DOCUMENTS

| 7,870,439 B2 * | 1/2011 | Fujiyama ............ G06F 11/1641 714/11 |
| 8,762,288 B2 | 6/2014 | Dill |

(Continued)

OTHER PUBLICATIONS

U.S. Appl. No. 15/075,343 office action dated Jul. 13, 2018.
(Continued)

*Primary Examiner* — Michael Pyzocha
(74) *Attorney, Agent, or Firm* — Kligler & Associates Patent Attorneys Ltd

(57) ABSTRACT

A method for computer system forensics includes receiving an identification of at least one host computer that has exhibited an anomalous behavior, in a computer network comprising multiple host computers. Respective images of the host computers in the network are assembled using image information collected with regard to the host computers. A comparison is made between at least one positive image of the at least one host computer, assembled using the image information collected following occurrence of the anomalous behavior, and one or more negative images assembled using the image information collected with respect to one or more of the host computers not exhibiting the anomalous behavior. Based on the comparison, a forensic indicator of the anomalous behavior is extracted from the positive and negative images.

26 Claims, 4 Drawing Sheets

Related U.S. Application Data division of application No. 14/758,966, filed as application No. PCT/IB2014/058299 on Jan. 15, 2014, now Pat. No. 9,979,739.

(60) Provisional application No. 61/752,984, filed on Jan. 16, 2013.

(51) Int. Cl.
    *G06F 21/56*     (2013.01)
    *H04L 29/12*     (2006.01)

(52) U.S. Cl.
    CPC ...... *H04L 61/1511* (2013.01); *H04L 63/0227* (2013.01); *H04L 63/1416* (2013.01); *H04L 63/1441* (2013.01); *H04L 2463/121* (2013.01)

(58) Field of Classification Search
    CPC . H04L 2463/121; G06F 21/566; G06F 21/552
    See application file for complete search history.

(56) References Cited

U.S. PATENT DOCUMENTS

| | | | |
|---|---|---|---|
| 8,769,681 | B1 | 7/2014 | Michels et al. |
| 9,117,075 | B1* | 8/2015 | Yeh .................... G06F 21/56 |
| 10,237,875 | B1 | 3/2019 | Romanov |
| 2002/0133586 | A1 | 9/2002 | Shanklin et al. |
| 2003/0133443 | A1 | 7/2003 | Klinker et al. |
| 2004/0003286 | A1* | 1/2004 | Kaler .................... G06F 21/554 726/25 |
| 2004/0199793 | A1 | 10/2004 | Wilken et al. |
| 2005/0060295 | A1 | 3/2005 | Gould et al. |
| 2005/0198269 | A1* | 9/2005 | Champagne ............ H04L 45/00 709/224 |
| 2005/0286423 | A1 | 12/2005 | Poletto et al. |
| 2006/0018466 | A1* | 1/2006 | Adelstein ............ H04L 63/1425 380/46 |
| 2006/0031673 | A1* | 2/2006 | Beck .................... G06F 21/565 713/164 |
| 2006/0107321 | A1* | 5/2006 | Tzadikario .......... H04L 63/0227 726/22 |
| 2006/0137009 | A1 | 6/2006 | Chesla |
| 2006/0259967 | A1* | 11/2006 | Thomas ................ H04L 63/145 726/22 |
| 2008/0028048 | A1* | 1/2008 | Shekar CS .......... G06F 9/44505 709/220 |
| 2008/0262991 | A1 | 10/2008 | Kapoor et al. |
| 2010/0280978 | A1* | 11/2010 | Shimada ............. H02J 13/0079 706/12 |
| 2010/0284282 | A1 | 11/2010 | Golic |
| 2011/0125770 | A1 | 5/2011 | Battestini et al. |
| 2012/0137342 | A1* | 5/2012 | Hartrell ................ G06F 21/552 726/1 |
| 2012/0191660 | A1* | 7/2012 | Hoog .................... G06F 21/552 707/661 |
| 2012/0240185 | A1 | 9/2012 | Kapoor et al. |
| 2014/0143538 | A1* | 5/2014 | Lindteigen .......... H04L 63/1441 713/156 |
| 2015/0341380 | A1 | 11/2015 | Heo et al. |
| 2015/0341389 | A1 | 11/2015 | Kurakami |
| 2016/0127390 | A1 | 5/2016 | Lai et al. |
| 2017/0078312 | A1 | 3/2017 | Yamada et al. |
| 2017/0262633 | A1* | 9/2017 | Miserendino ......... G06F 21/566 |

OTHER PUBLICATIONS

U.S. Appl. No. 15/950,234 office action dated Mar. 24, 2020.
International Application # PCT/IB2019/060538 search report dated Feb. 28, 2020.
Bhuyan et al., "Surveying Port Scans and Their Detection Methodologies", Computer Journal, vol. 54, No. 10, pp. 1565-1581, Apr. 20, 2011.

* cited by examiner

AUTOMATED FORENSICS OF COMPUTER SYSTEMS USING BEHAVIORAL INTELLIGENCE

CROSS-REFERENCE TO RELATED APPLICATIONS

This application is a continuation of U.S. patent application Ser. No. 15/286,643, filed Oct. 6, 2016, which is a division of U.S. patent application Ser. No. 14/758,966, filed Jul. 2, 2015, in the national phase of PCT Patent Application PCT/IB2014/058299, filed Jan. 15, 2014, which claims the benefit of U.S. Provisional Patent Application 61/752,984, filed Jan. 16, 2013, which is incorporated herein by reference.

FIELD OF THE INVENTION

The present invention relates generally to computer networks, and particularly to systems, method and software for detecting malicious activity in computer networks.

BACKGROUND

In many computer and network systems, multiple layers of security apparatus and software are deployed in order to detect and repel the ever-growing range of security threats. At the most basic level, computers use anti-virus software to prevent malicious software from running on the computer. At the network level, intrusion detection and prevention systems analyze and control network traffic to prevent malware from spreading through the network.

In this latter category, for example, PCT International Publication WO 2013/014672, whose disclosure is incorporated herein by reference, describes a method and system for detecting anomalous action within a computer network. The method starts with collecting raw data from at least one probe sensor that is associated with at least one router, switch or server in the computer network. The raw data is parsed and analyzed to create meta-data from the raw data, and computer network actions are identified based on knowledge of network protocols. The meta-data is associated with entities by analyzing and correlating between the identified network actions. A statistical model of the computer network is created, for detection of anomalous network actions associated with the entities.

SUMMARY

Embodiments of the present invention that are described hereinbelow provide methods, apparatus and software for analyzing and inhibiting malicious activity in a computer network. There is therefore provided, in accordance with an embodiment of the present invention, a method for computer system forensics. The method includes receiving an identification of at least one host computer that has exhibited an anomalous behavior, in a computer network including multiple host computers. Respective images of the host computers in the network are assembled using image information collected with regard to the host computers. A comparison is made between at least one positive image of the at least one host computer, assembled using the image information collected following occurrence of the anomalous behavior, and one or more negative images assembled using the image information collected with respect to one or more of the host computers not exhibiting the anomalous behavior. Based on the comparison, a forensic indicator of the anomalous behavior is extracted from the positive and negative images.

In a disclosed embodiment, receiving the identification includes mapping respective suspiciousness levels of the host computers in the network, and initiating the comparison when the suspiciousness levels meet a predefined trigger condition.

The image information may include one or more types of information concerning aspects of a host computer, selected from a group of aspects consisting of an operating system installed on the host computer; software programs installed on the host computer; a hardware state of the host computer; a software configuration of the host computer; software components running on the host computer; resources in use on the host computer; users of the host computer; files on the host computer; logs collected by a host computer; and a memory dump of the host computer.

The image information may be collected from the host computers periodically. Additionally or alternatively, the image information may be collected in response to an indication of a suspicious behavior in the network.

Typically, the one or more of the negative images include at least one image of the at least one host computer, wherein the at least one image is assembled using the image information collected with respect to the at least one host computer prior to the anomalous behavior.

In disclosed embodiments, making the comparison includes comparing multiple positive images, which are associated with the anomalous behavior, to multiple negative images. The multiple positive and negative images may include at least one image taken from another host computer having characteristics similar to the at least one host computer that exhibited the anomalous behavior.

In some embodiments, extracting the forensic indicator includes finding a commonality of the positive images that is absent from the negative images. Finding the commonality may include identifying a property that is matched exactly in all of the positive images. Additionally or alternatively, finding the commonality may include identifying a property of one of the positive images, and generalizing the property so that all of the positive images, but not the negative images, match the generalized property.

In another embodiment, extracting the forensic indicator includes identifying a property that occurs with a first probability in the positive images and occurs with a second probability, lower than the first probability, in the negative images.

Additionally or alternatively, extracting the forensic indicator includes finding a commonality of the negative images that is absent from the positive images.

Typically, extracting the forensic indicator includes providing an identification of at least one of a file and a directory that is associated with the anomalous behavior.

There is also provided, in accordance with an embodiment of the present invention, a method for computer system forensics, which includes receiving an identification of an anomalous message transmitted by a host computer in a computer network including multiple host computers. Messages transmitted by the host computers are monitored so as to detect, for each monitored message, a respective process that initiated the message. Responsively to the identification, a forensic indicator is extracted of the respective process that initiated the anomalous message.

In some embodiments, receiving the identification includes determining that the anomalous message is associated with a specified destination. Typically, monitoring the messages includes configuring a filter on the host computers to detect the respective process that initiates the messages that are associated with the specified destination.

In a disclosed embodiment, monitoring the messages includes configuring a monitoring program running on the host computers to filter the messages transmitted by the host computers in accordance with a filtering criterion that is associated with the anomalous message, and to identify the respective process that initiated the messages that satisfy the filtering criterion. Monitoring the messages may include detecting calls to a specified application program interface (API) or detecting Domain Name System (DNS) lookups.

There is additionally provided, in accordance with an embodiment of the present invention, a method for computer system forensics, which includes receiving an identification of a time of occurrence of an anomalous event in a computer network including multiple host computers. Logs are collected of activity of entities in the computer network. A comparison is made between first entries in at least one of the logs collected within a predefined time interval of the time of the occurrence of the anomalous event, and second entries in the at least one of the logs collected outside the predefined time interval. Based on the comparison, a forensic indicator associated with the anomalous event is extracted from the logs.

Typically, collecting the logs includes collecting information from a log selected from a set of logs consisting of host computer logs, system event logs, system-wide application event logs, security logs, audit logs, application-specific logs, file system tables, and browsing histories.

In a disclosed embodiment, the identification specifies at least one of the host computers that is associated with the anomalous event, and making the comparison includes processing log information with respect to the at least one of the host computers. Receiving the identification typically includes receiving a timestamp associated with an anomalous message transmitted by one of the host computers.

In some embodiments, extracting the forensic indicator includes assigning respective scores to lines of the logs in the first entries, and extracting the forensic indicators from the lines that meet a predefined scoring criterion.

Typically, extracting the forensic indicator includes providing at least one identifier selected from a group of identifiers consisting of filenames, paths, registry paths, process names, module names, application names, and e-mail GUIDS that appear in the logs.

There is further provided, in accordance with an embodiment of the present invention, apparatus for computer system forensics, including an interface, configured to receive an identification of at least one host computer that has exhibited an anomalous behavior, in a computer network including multiple host computers. A processor is configured to assemble respective images of the host computers in the network using image information collected with regard to the host computers, to make a comparison between at least one positive image of the at least one host computer, assembled using the image information collected following occurrence of the anomalous behavior, and one or more negative images assembled using the image information collected with respect to one or more of the host computers not exhibiting the anomalous behavior, and based on the comparison, to extract from the positive and negative images a forensic indicator of the anomalous behavior.

There is moreover provided, in accordance with an embodiment of the present invention, apparatus for computer system forensics, including an interface, which is configured to receive an identification of an anomalous message transmitted by a host computer in a computer network including multiple host computers. A processor is coupled to cause the host computers to monitor messages transmitted by the host computers so as to detect, for each monitored message, a respective process that initiated the message, and which is configured to extract, responsively to the identification, a forensic indicator of the respective process that initiated the anomalous message.

There is furthermore provided, in accordance with an embodiment of the present invention, apparatus for computer system forensics, including an interface, which is configured to receive an identification of a time of occurrence of an anomalous event in a computer network including multiple host computers. A processor is configured to collect logs of activity of entities in the computer network, to make a comparison between first entries in at least one of the logs collected within a predefined time interval of the time of the occurrence of the anomalous event, and second entries in the at least one of the logs collected outside the predefined time interval, and based on the comparison, to extract from the logs a forensic indicator associated with the anomalous event.

There is also provided, in accordance with an embodiment of the present invention, a computer software product, including a computer-readable medium in which program instructions are stored, which instructions, when read by a computer, cause the computer to receive an identification of at least one host computer that has exhibited an anomalous behavior, in a computer network including multiple host computers, to assemble respective images of the host computers in the network using image information collected with regard to the host computers, to make a comparison between at least one positive image of the at least one host computer, assembled using the image information collected following occurrence of the anomalous behavior, and one or more negative images assembled using the image information collected with respect to one or more of the host computers not exhibiting the anomalous behavior, and based on the comparison, to extract from the positive and negative images a forensic indicator of the anomalous behavior.

There is additionally provided, in accordance with an embodiment of the present invention, a computer software product, including a computer-readable medium in which program instructions are stored, which instructions, when read by a computer, cause the computer to receive an identification of an anomalous message transmitted by a host computer in a computer network including multiple host computers, to cause the host computers to monitor messages transmitted by the host computers so as to detect, for each monitored message, a respective process that initiated the message, and to extract, responsively to the identification, a forensic indicator of the respective process that initiated the anomalous message.

There is further provided, in accordance with an embodiment of the present invention, a computer software product, including a computer-readable medium in which program instructions are stored, which instructions, when read by a computer, cause the computer to receive an identification of a time of occurrence of an anomalous event in a computer network including multiple host computers, to collect logs of activity of entities in the computer network, to make a comparison between first entries in at least one of the logs collected within a predefined time interval of the time of the occurrence of the anomalous event, and second entries in the at least one of the logs collected outside the predefined time interval, and based on the comparison, to extract from the logs a forensic indicator associated with the anomalous event.

The present invention will be more fully understood from the following detailed description of the embodiments thereof, taken together with the drawings in which:

DETAILED DESCRIPTION OF EMBODIMENTS

Overview

Figure 1:
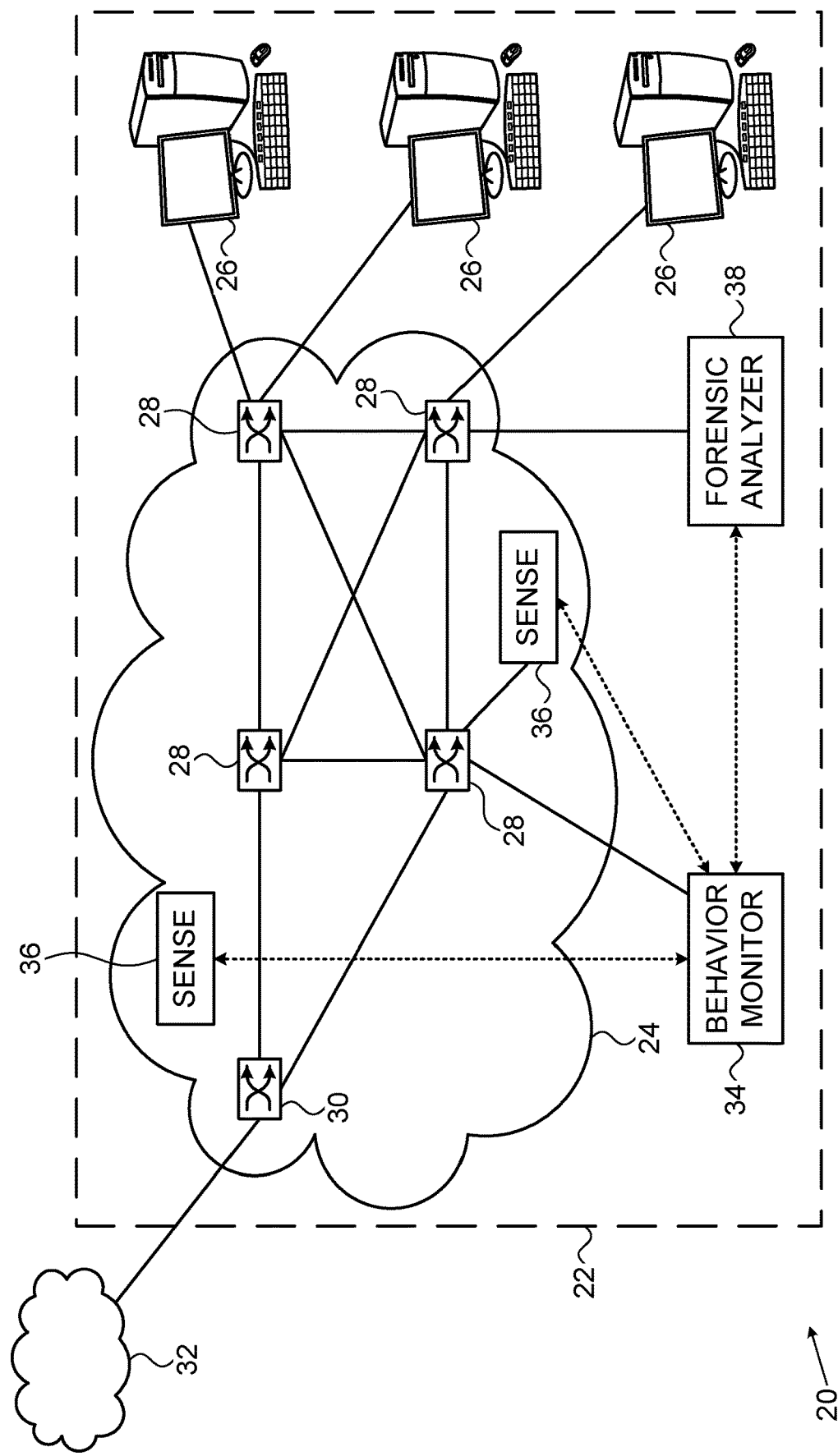
FIG. 1 is a block diagram that schematically shows a computer system, in accordance with an embodiment of the present invention.

Computer security tools that are known in the art, such as those described in the Background section, are capable of identifying certain threats, at the host computer or network level, and alerting the operator of the computer or the network in which a threat has been detected. An expert user may then perform a forensic investigation in order to identify the source of the threat, such as a malicious file or process. Once the source of the threat has been identified, the user may initiate remedial action in order to remove the source and/or block its activity and propagation.

Embodiments of the present invention that are described hereinbelow automate the process of forensic investigation. In these embodiments, a computer that is configured to operate automatically as a forensic analyzer receives behavioral intelligence from a network, along with information provided by host computers and other entities on the network regarding their current state and activity. The term "behavioral intelligence" is used in the context of the present patent application to mean indications of anomalous behavior, such as messages (typically packets) or patterns of messages within the network that arouse suspicion of malicious activity. In response to such a report of suspicious behavior, the forensic analyzer processes and compares the information provided by the host computers in order to extract forensic indicators, pointing to possible sources of the suspicious behavior, such as suspicious files, directories, data elements, addresses, and/or processes.

Such forensic indicators may be used in various ways to enhance network security and increase the efficiency of detection and inhibition of security threats. For example, the indicators provided by the forensic analyzer may be used to automatically neutralize the sources of suspicious behavior (typically by blocking certain processes or removing or preventing access to certain files) or may be used by the system administrator in deciding on such preventive action. Additionally or alternatively, the indicators may be applied in evaluating the behavioral intelligence received by the forensic analyzer, in order to raise security alerts when appropriate (and provide richer information upon reporting such alerts) and/or to suppress false alarms that might otherwise be raised due to anomalous behavior of innocent origin.

In embodiments of the present invention, various types of behavioral intelligence and host information are used to generate different sorts of forensic indicators. In one embodiment, the forensic analyzer assembles respective images of the host computers in the network using image information collected with regard to the host computers. An "image" in this context is a record of the current state of the computer, which may include aspects of the states of the hardware, software, and data in the memory; and the term "image information" refers to the information used in assembling the image.

Upon receiving behavioral intelligence that identifies a host computer that has exhibited an anomalous behavior, the forensic analyzer selects and compares "positive" and "negative" images. The positive image is an image of the identified host computer (or of multiple such computers), assembled using image information collected following occurrence of the anomalous behavior. The negative image is assembled using image information collected with respect to one or more of the host computers not exhibiting the anomalous behavior. Typically, to achieve sufficient accuracy and specificity, multiple positive and negative images are assembled and compared. Based on the comparison, the forensic analyzer extracts from the positive and negative images a forensic indicator of the anomalous behavior.

In another embodiment, the behavioral intelligence received by the forensic analyzer comprises an identification of an anomalous message (typically a packet) transmitted by a host computer. In this embodiment, the forensic analyzer monitors messages transmitted by the host computers so as to detect the initiating process (as well as the initiating and/or thread if applicable) for each message, or at least some of the messages, i.e., the process running on the computer that caused the message to be sent. Thus, when an anomalous message is identified, the forensic analyzer is able to extract a forensic indicator of the initiating process. In still another embodiment, the behavioral intelligence may include the identification of a time of occurrence of an anomalous event in a computer network, or of a set of such occurrences. To handle this sort of intelligence, the forensic analyzer collects logs of activity of entities in the computer network, including, for example, logs concerning programs, processes, and/or files on the host computers. Upon receiving the time of an anomalous event, the forensic analyzer assembles sets of "positive" log entries, collected within a predefined time interval of the time of the event, and "negative" log entries collected outside this time interval. The forensic analyzer compares the sets of positive and negative log entries in order to extract a forensic indicator associated with the anomalous event.

Further, more detailed examples of these embodiments are presented in the description that follows. Although for the sake of clarity, the different embodiments and examples are presented separately, in practice a forensic analyzer may apply several or all of the disclosed techniques in parallel.

System Description

FIG. 1 is a block diagram that schematically shows a computer system 20, in accordance with an embodiment of the present invention. System 20 in this example is contained in a facility 22, such as an office or a campus, with a protected local packet communication network 24. The system comprises multiple host computers 26, which may be servers, clients, or substantially any other type of computing appliance. The host computers are interconnected by switches 28 in network 24, while a gateway switch 30 connects network 24 to an external, public network 32, such as the Internet. Switches 28 and 30 may comprise bridges, routers, or substantially any other suitable type of network switching element that is known in the art.

A behavior monitor 34 in facility 22 collects behavioral information from one or more sensors 36 that are distributed within network 24, and processes this information in order to generate behavioral intelligence. Behavior monitor 34 and sensors 36 may operate, for example, as described in the above-mentioned PCT International Publication WO 2013/014672. The operation of behavior monitor 34 and sensors 36, however, is beyond the scope of the present description, and any suitable sort of behavior monitoring may be applied in system 20. Various commercially-available products may be used for this purpose, such as the MAGNA™ line of appliances offered by Light Cyber Ltd. (Ramat Gan, Israel).

A forensic analyzer 38 receives behavioral intelligence from behavior monitor 34, as well as information from and regarding host computers 26. Based on these inputs, the forensic analyzer computes and outputs forensic indicators with respect to anomalous behaviors and events in facility 22. Specific methods and indicators generated by analyzer 38 are described further hereinbelow. Based on these indicators, the forensic analyzer may output alerts to a system administrator and/or to a security information and event management (SIEM) server or security operations center (SOC) of facility 22 (not shown in the figures).

Figure 2:
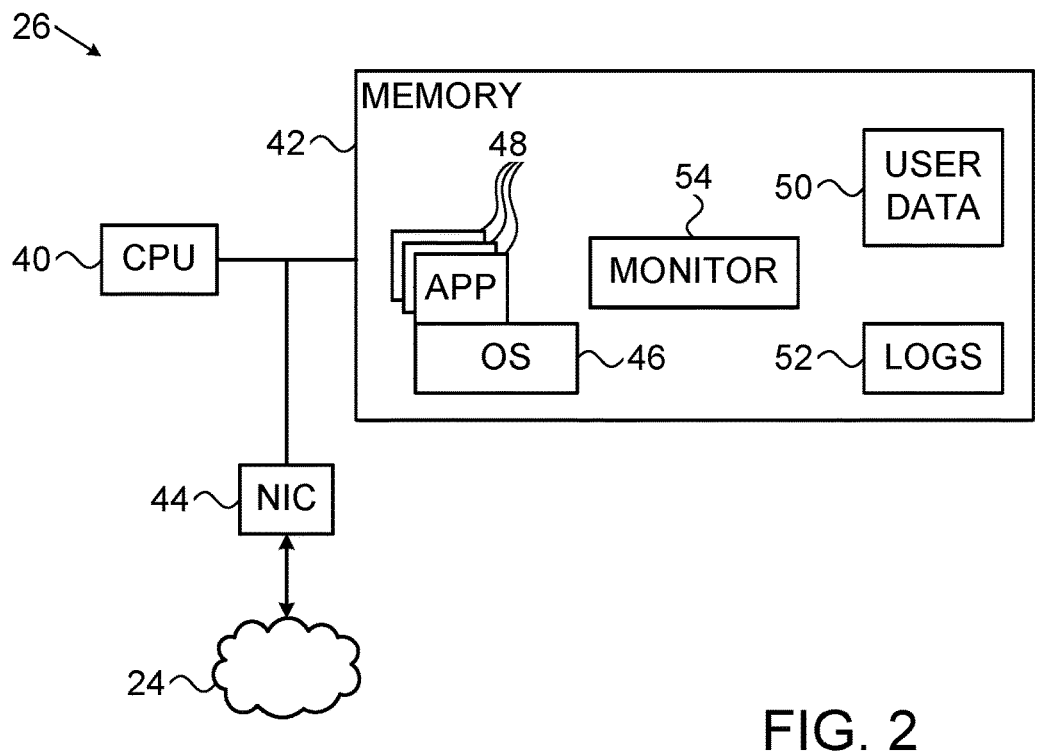
FIG. 2 is a block diagram that schematically shows elements of a host computer, in accordance with an embodiment of the present invention.

FIG. 2 is a block diagram that schematically shows elements of one of host computers 26, in accordance with an embodiment of the present invention. (Host computers 26 are also referred to simply as "hosts" for short.) Computer 26 comprises a central processing unit (CPU) 40 and a memory 42, along with a network interface controller (NIC) 44, which connects the computer to network 24. Memory 42 contains programs and data, including (but not limited to) an operating system 46, applications 48, and user data 50, as are known in the art. Operating system 46 and/or certain applications 48 typically write entries to logs 52 in memory 42, which may be output to and used by forensic analyzer 38 for certain analyses, as described below. Additionally or alternatively, a monitoring program 54 running on computer 26 collects and transmits information to forensic analyzer 38.

The information collected by forensic analyzer 28 from host computers 26 may comprise one or more of the following types of image information:
 1. Operating system version and installed updates.
 2. Installed software, including end-point security software, such as anti-virus (including version number and last update time), drivers, and services.
 3. Hardware state including CPU and memory use, network interfaces, webcam, microphone, and other peripheral devices.
 4. Operating system and installed software configuration (including the Windows® Registry or equivalent in other operating systems).
 5. Running software including processes, loaded dynamic link libraries (DLLs), drivers, services, threads, and other software components.
 6. Resources in use, such as open files, network sockets, and hooks, typically with an identification the process using each resource.
 7. Information on users, such as the identity of the users who are currently logged on, credentials used for running software, local users and groups.
 8. Files, identified by filename, path, attributes, content checksum (such as MD5), digital signature, and actual content attributes.
 9. System and application logs 52.
 10. Memory dump.

Another possible function of monitoring program 54, in addition to or instead of collecting image information, is monitoring of network activity by computer 26. In this capacity, monitoring program 54 associates each packet transmitted via NIC 44 with the process (and possibly the module and/or thread if applicable) in memory 42 that initiated the packet. The monitoring program may similarly associate other low-level network activities carried out by computer 26, such as internal communication control activities, with respective initiating processes. Monitoring program 54 reports this information to forensic analyzer 38 when and as required, as described further hereinbelow.

The specific implementation of monitoring program 54 may differ among different host computers on account of architecture, network hardware, operating system, network activity type, and host-specific constraints. For example, on critical servers, the monitoring program is typically implemented in a way that interferes only minimally, or not at all, with normal server communications and other operations, whereas a greater degree of interference may be tolerated in monitoring programs running on ordinary workstations.

Figure 3:
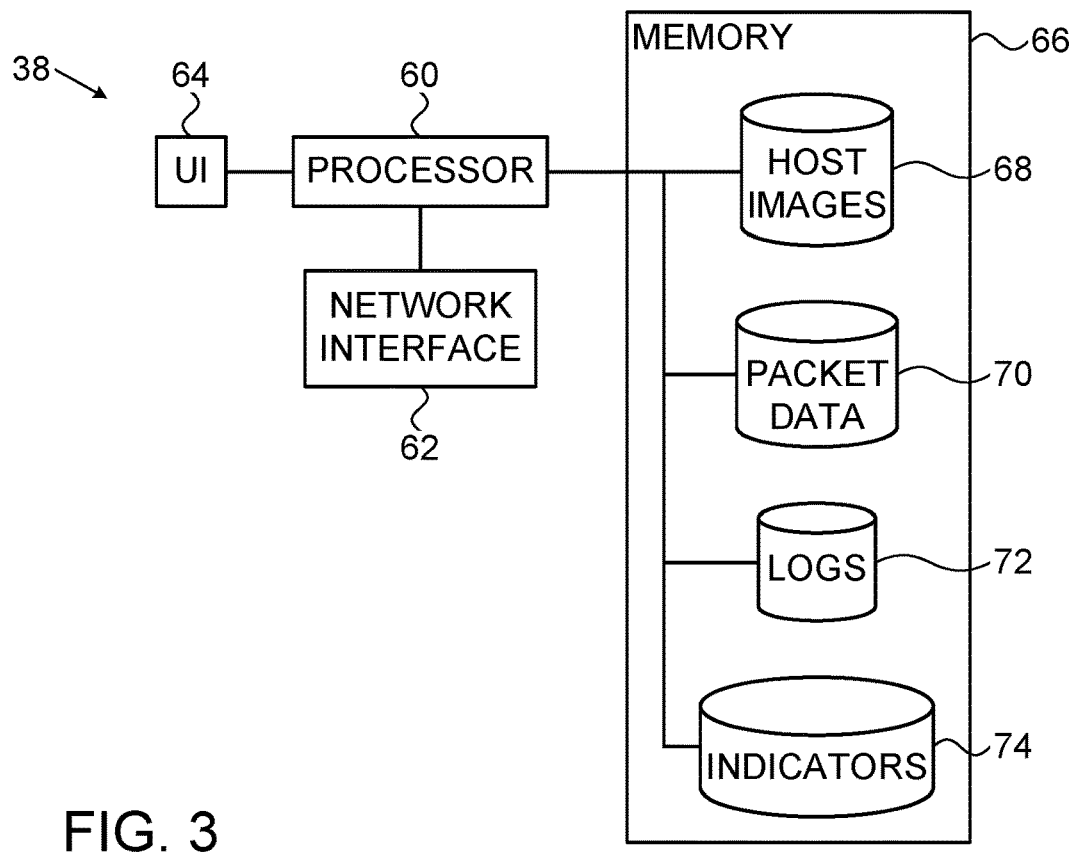
FIG. 3 is a block diagram that schematically shows elements of a forensic analyzer, in accordance with an embodiment of the present invention.

FIG. 3 is a block diagram that schematically shows elements of forensic analyzer 38, in accordance with an embodiment of the present invention. Typically, the forensic analyzer is built around a general-purpose computer processor 60, with a network interface 62, memory 66, and optional a user interface 64 or other output interface. Processor 60 is programmed in software to carry out the functions that are described herein. The software may be downloaded to forensic analyzer 38 in electronic form, over a network, for example. Additionally or alternatively, the software may be stored in tangible, non-transitory computer-readable media, such as magnetic, optical, or electronic memory media, which may be embodied in memory 66. Further additionally or alternatively, at least some of the functions of processor 60 may be implemented in programmable or hard-wired hardware logic.

Processor 60 collects and stores in memory 66 various sorts of information regarding host computers 26 and activity on network 24. The information used in embodiments of the present invention may include one or more of the following information categories:
 Host images 68, comprising image information, for example of the types listed above. Forensic analyzer 38 may collect and update this information regularly during operation of system 20 or, alternatively or additionally, at certain specified times. Thus, image collection may be:
 1. Periodic.
 2. Retroactive (in cases in which the relevant information is stored for a period of time, such as in system event logs).
 3. Proactive—immediately upon receiving an alert from behavior monitor 34 or from another detector of security threats. This mode of collection can be useful in capturing relevant information while the suspicious activity is in progress, or more generally after a certain host computer 26 has been flagged as suspicious.
 4. Trigger-based—collect information based on an expected event or condition. Collection may be triggered, for example, at set times (particularly when a suspicious activity is identified as periodic), or when outgoing traffic from a host meets a given condition, or subject to other event/condition rules that may be set by the system operator or activated automatically by forensic analyzer 38.

Packet data 70, containing records of data packets (or more generally, messages transmitted over network 22) that were identified as anomalous, along with information provided by monitoring program 54 on host computers 26 as to the processes that initiated transmission of these packets.

Logs 72, containing information collected from logs 52 on host computers 26, as well as other entities on network 24. This information may be collected based on scheduling and conditions similar to those listed above with respect to host images 68.

Indicators 74, containing forensic indicators that are associated with given types of anomalous behavior, and particularly with anomalous behaviors that have been identified as security threats. The stored indicators may include both indicators that have been inferred by forensic analyzer 38 and possibly additional indicator information that may be shared (via a site on network 32, for example) among forensic analyzers in different networks or input by a system operator.

Details and use of these various types of information are described in the sections that follow.

Forensic Investigation Using Host Images

Figure 4:
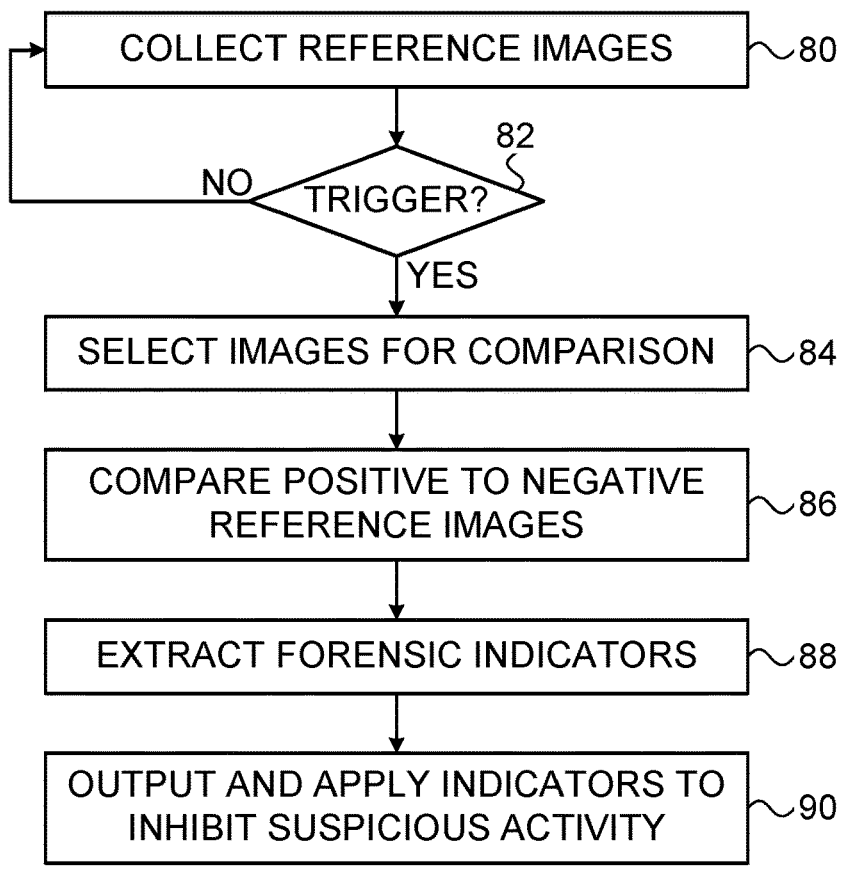
FIGS. 4-6 are flow charts that schematically illustrate methods for computer forensic analysis, in accordance with embodiments of the present invention.

FIG. 4 is a flow chart that schematically illustrates a method for computer forensic analysis, in accordance with an embodiment of the present invention. This and the following methods are described, for the sake of convenience and clarity, with reference to the elements of system 20, as shown in FIGS. 1-3 above. The principles of these methods may be applied, however, in substantially any suitable system configuration in which behavioral intelligence is to be collected and acted upon.

During normal operation of system 20, forensic analyzer 38 collects reference images of host computers 26, at a reference collection step 80. The types of image information that may be collected and strategies for collection of the information are described above. The forensic analyzer meanwhile receives behavioral intelligence from monitor 34 (and possibly other sources) and evaluates the intelligence to assess whether a trigger condition has been met, indicating that a forensic investigation should be initiated, at a triggering step 82.

The trigger at step 82 may take various forms, depending on the type of behavioral intelligence that forensic analyzer 28 receives. In one embodiment, the behavioral intelligence comprises a mapping of host computers 26 in network 24, which provides, from time to time, a scalar value representing the suspiciousness level of each host computer at that moment. This suspiciousness level may be derived, for example, from network traffic transmitted by each of the host computers. This behavioral intelligence may be viewed as a matrix, with rows corresponding to the host computers and columns to times occurring at a certain frequency, for instance:

TABLE I

BEHAVIORAL INTELLIGENCE MAPPING

| | 1/10/2013 03:00:00 | 1/10/2013 04:00:00 | 1/10/2013 05:00:00 |
|---|---|---|---|
| PC01 | 0.7 | 0.7 | 1 |
| PC02 | 0 | 0 | 0 |
| PC03 | 0.2 | 0.3 | 0 |
| PC04 | 1 | 1 | 1 |

The trigger at step 82 may be generated, for example, when one of the rows exceeds a certain threshold suspiciousness level, or when multiple rows (or all of the rows together) meet a certain cumulative trigger condition.

When an investigation is initiated, forensic analyzer 28 selects negative and positive reference images for comparison, at an image selection step 84. Typically, the forensic analyzer selects the following sorts of reference images:

Negative references:
  Older images of a suspicious host computer (or of multiple suspicious host computers) before it was flagged as suspicious.
  Images of other host computers with similar characteristics (based, for example, on whether the computers are workstations or servers, on operating system version, and possibly other criteria), that have a low level of suspiciousness, or at least do not exhibit the same type of suspicious behavior as the present suspicious host.

Positive references
  Newer images of the same host computer (or multiple suspicious host computers) after it was flagged as suspicious.
  Images of other host computers with similar characteristics that exhibit the same type of suspicious behavior.

The reference images may be selected at step 84 from among host images 68 in memory 66 of forensic analyzer 38. Additionally or alternatively, when not enough reference images are available in memory 66, or if these reference images are outdated, the forensic analyzer may collect additional host images on demand, as noted above. The number of reference images in each of the positive and negative groups may be chosen according to tolerances of false-positive and false-negative results that are set by the system operator, as well as feedback from previous iterations. For example, if too few or too many indicators were detected in the previous round, the number of reference images can be increased accordingly. Thus, effort invested in image collection and storage (in terms of consumption of resources of processor 60 and memory 66) may be traded off against indicator quality.

Processor 60 compares the positive to the negative images, in order to find commonalities between the positive images that are absent (or at least largely absent) from the negative images, at an image comparison step 86. Based on these commonalities, processor 60 extracts forensic indicators that are associated with the suspicious behavior of the host computer or computers 26 that are the subject of the positive indicators, at an indicator extraction step 88. An indicator in this sense is a predicate that can either manifest (the image exhibits the indicator) or not manifest (the image does not exhibit the indicator) in each image. For example, an indicator may have the form: "a file by the name jwpcf.exe is found in drive c:\." In this case, each image contains the entire directory structure of this drive, and processor 60 can thus determine for each image whether the indicator is true of false.

Forensic analyzer 38 may apply various criteria in comparing the positive and negative images at step 86, for example:

Criterion #1: Exact Match

Look for one or more properties that are common to the suspicious host computer (or computers) and all positive references, and are not found in any negative reference image. A property of this type could be, for instance, that a file named abcdefg.dll exists on all host computers exhibiting a certain suspicious behavior and does not exist on any of the hosts not exhibiting the same suspicious behavior. In formal terms, this criterion may be expressed as follows:

$$(\text{suspicious} \Rightarrow \text{indicator} \wedge \neg\text{suspicious} \Rightarrow \neg\text{indicator}) \Rightarrow (\text{suspicious} \Leftrightarrow \text{indicator})$$

Criterion #2: Approximate Match

Examine the properties that are unique to the suspicious host or hosts in comparison to each of the negative reference hosts, and generalize the list of unique properties to give a set of approximate properties. For example, the unique property, "a file exists at the location c:\path\abcdefg.dll and has the size 41252 bytes," can be generalized to "a file exists at the location c:\path," or "a file exists at the location c:\path and has the size 41252 bytes," or "a file exists at the location c:\path with the extension DLL and a size in the range of 35,000 to 45,000 bytes," and so forth.

The set of approximate properties is then examined in the same way as in Criterion 1 described above. If, for example, a malware program saves a copy of itself under a random file name, such as "c:\path\abcdefg.dll" on one infected host and "c:\path\erttyui.dll" on another infected host, the approximate property that "a file exists at c:\path with the size XXX bytes" will be common to all positive reference hosts and will not be a property of any negative reference host.

Processor 60 may traverse a "generalization path" to go through various possible generalizations from a specific indicator found initially to a final, more general indicator. The processor may apply a greedy search algorithm for this purpose. For example, if we consider a situation in which the suspiciousness matrix at a given time scores host A as very suspicious and forty other hosts H1 to H40 as not suspicious, the existence of the file "c:\temp\virus\virus.exe" on host A and not on hosts H1 to H40 makes this a good indicator of the suspicious behavior. Suppose also that the directory "c:\temp\virus" exists on host A and not on H1 to H40. The existence of this directory is then a good generalization of the specific indicator. If, however, the directory "c:\temp" exists on many hosts among H1 to H40, then this additional generalization will not be effective, and processor 60 will then cease to explore generalizations along this avenue and may check other possible types of generalization.

Criterion #3: Probabilistic Match

This criterion is similar to Criterion #1, but requires only that a given property be much more common in the positive group than in the negative group. For example, if the positive and negative reference groups each contain ten hosts, and a given property appears in half (five) of the negative reference hosts and in nine out of ten positive reference hosts, then it is highly likely that this property is a valid indicator. (According to the statistical Chi Test, there is a probability of only about 1% that the occurrence of the property in the above distribution is a random event.) The probabilistic match criterion can similarly be applied in finding approximate properties, using Criterion #2.

Criterion #4: Negative Match

This criterion operates in the same manner as the previous criteria, but instead seeks properties that exist on negative reference hosts and do not exist on positive reference hosts. A property of this sort might be, for example, that "anti-virus software is updated." Negative matches may also be of the approximate and probabilistic forms described above.

To complete step 88, forensic analyzer 38 typically collects the indicators generated using the various matching criteria in step 86 and prioritizes the significance of each indicator. The forensic analyzer may also collect additional relevant metadata, and may cross-reference the indicators with other data sources. For example, when one or more indicators reference a particular file on the host computer, the contents of that file or a hash of the contents (such as MD5 or SHA1) can be extracted and cross-referenced with external repositories of known benign and harmful files, or the contents may be stored for manual analysis.

Forensic analyzer 38 typically outputs the indicators that it has found, at an output step 90. The indicators may be passed to a system administrator via interface 64, for example, or transmitted to a SIEM system or SOC. These indicators may then be applied in inhibiting the suspicious activity that was detected, for example by checking all host computers 26 in system 20 for the indicators, and then quarantining and cleaning files and/or directories that are implicated by the indicators. Additionally or alternatively, the indicators may be used in investigating and blocking the source of an infection, and possibly in finding and prosecuting the party responsible.

Forensic Investigation of Anomalous Messages

Figure 5:
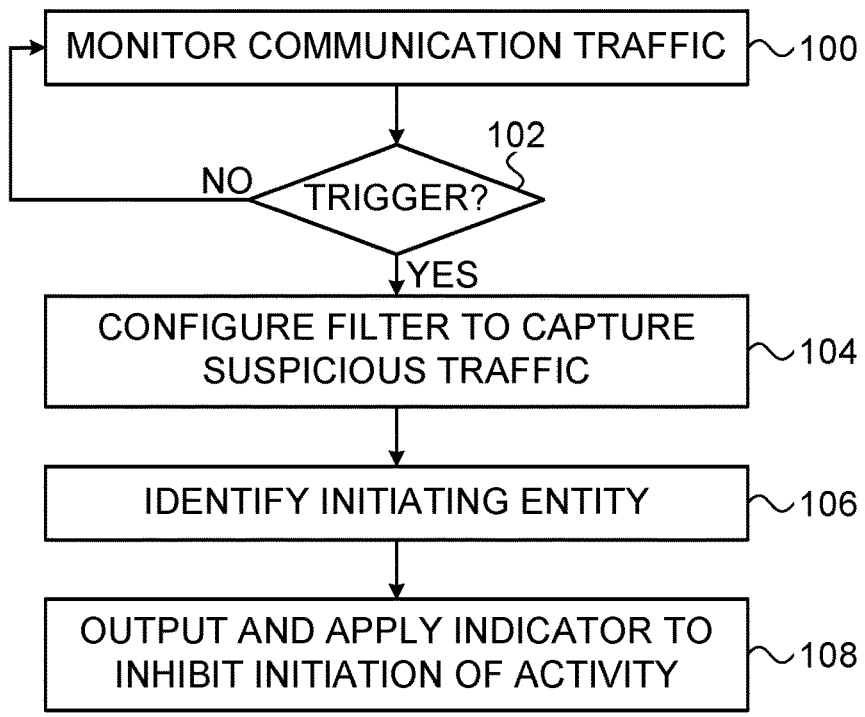

FIG. 5 is a flow chart that schematically illustrates a method for computer forensic analysis, in accordance with another embodiment of the present invention. Whereas the image-based method described above reviews a broad range of host properties, starting from a generic indication of suspicious behavior—and may accordingly be time-consuming and costly in terms of resource of the forensic analyzer—the method of FIG. 5 focuses sharply on a particular communication message. This latter method can thus quickly and precisely indicate the source of suspicious communication traffic, but is limited in scope relative to the preceding method. Forensic analyzer 38 may use both of these methods in a complementary fashion, or it may apply only one method or the other.

In the method of FIG. 5, behavior monitor 34 generates behavioral intelligence for forensic analyzer 38 by monitoring communication traffic on network, at a monitoring step 100. Operation of the forensic analyzer is triggered when the behavior monitor detects a suspicious communication flow or pattern, such as a message directed to a suspect destination, at a triggering step 102. In this case, the behavioral intelligence supplied to the forensic analyzer will be used to define a filter that can be applied to each outgoing packet in network 24, such that each packet processed by the forensic analyzer will either manifest the condition of the filter or not. For example, assuming behavior monitor 34 comes to suspect that the domain "malware.virus.ru" is a malicious command and control server associated with some malware infecting a host, an appropriate filter would detect messages directed to or otherwise associated with this domain.

Forensic analyzer 38 configures a filter to capture suspicious traffic in accordance with the behavioral intelligence that it has received, at a filter configuration step 104. In the above example, the filter could be configured to analyze UDP traffic so as to identify Domain Name System (DNS) lookups made by host computers 26 to resolve the name "malware.virus.ru." The filter may be implemented on host computers 26 by means of monitoring program 54 (FIG. 2), which operates in accordance with filtering instructions provided by forensic analyzer 38. As explained earlier, monitoring program 54 associates each packet and each low-level network activity with the process that initiated the packet or activity. Forensic analyzer 38 configures the monitoring program on each host computer with at least the filtering criteria that are associated with each of the suspicious behaviors that was reported by behavior monitor 34 on that host, or possibly suspicious behaviors reported in network 24 at large.

After configuring the filter, forensic analyzer 38 periodically samples the output of monitoring program 54 on each host computer 26 of interest (or on all of the host computers in network 24). The output of the monitoring program provides a listing of messages (typically, though not necessarily, packets) that were captured by each of the filters, along with an identification of the entity (typically, though not necessarily, a process) on the host computer that initiated each message. Using this information, forensic analyzer 38 is able to generate a forensic indicator, which identifies the entity that initiated each message captured by the filter, at an identification step 106.

Forensic analyzer 38 typically outputs the indicators that it has found, at an output step 108. As in the preceding embodiment, the indicators may be passed to a system administrator, for example, or transmitted to a SIEM system or SOC. These indicators may then be applied in inhibiting the suspicious activity that was detected. For example, the initiating process may be blocked on all host computers 26 in system 20, or at least on those host computers whose filters captured messages of the type in question. Additionally or alternatively, the indicators may be used in identified files or other data structures that caused the process to send these messages.

As noted earlier, the implementation of monitoring program 54 may differ among different networks and hosts. This difference is due, in part, to the different ways in which operating systems implement relevant network activities, resulting in different techniques for identifying the process that initiated the traffic. For example, in Windows®, a process can use the Windows application program interface (API) to create a socket, and can then carry out network activities using the methods of the socket. Therefore, in cases in which the filter is intended to capture messages in a proprietary protocol, monitoring program 54 may monitor calls to the Windows Send API.

On the other hand, for suspicious DNS lookup activity, the process initiating the activity may use the Windows DnsQuery API. In this case the process that actually performs the query will be a DNS client agent, which is a benign Windows component. If monitoring program 54 monitors calls to the Send API, forensic analyzer 38 may mistakenly associate this benign agent with the suspicious DNS lookup activity, rather than the process that initiated the lookup. Therefore, in this case the monitoring program should be configured to monitor calls to the DnsQuery API in order to find the source of the suspicious DNS packets.

As another example, behavior monitor 34 may detect suspicious behavior in the form of an unauthorized user attempting to log on to a database hosted at IP address 10.0.20.20 on port 3389 using his credentials. In this case two filters may be configured at step 104:

1. A first filter to capture sessions directed to 10.0.20.20: 3389.
2. A second filter to capture ticket requests associated with the database session using these credentials. (Such ticket requests are typically made to the ticket-granting server (TGS) on network 24, as defined in RFC-4120, referring to the Kerberos Network Authentication Service.)

In another scenario, behavior monitor 34 may detect that a certain host or hosts are spending an abnormal amount per time frame of DNS lookup for domain names that appear random. (This pattern is known to be characteristic of certain types of malware.) In this case, a filter may be configured at step 104 to apply a statistical language likelihood model to requested DNS lookups. The process that receives the highest scores from the model may be identified at step 106 as the entity initiating the suspicious communications.

Forensic Investigation Using Host Logs

Figure 6:
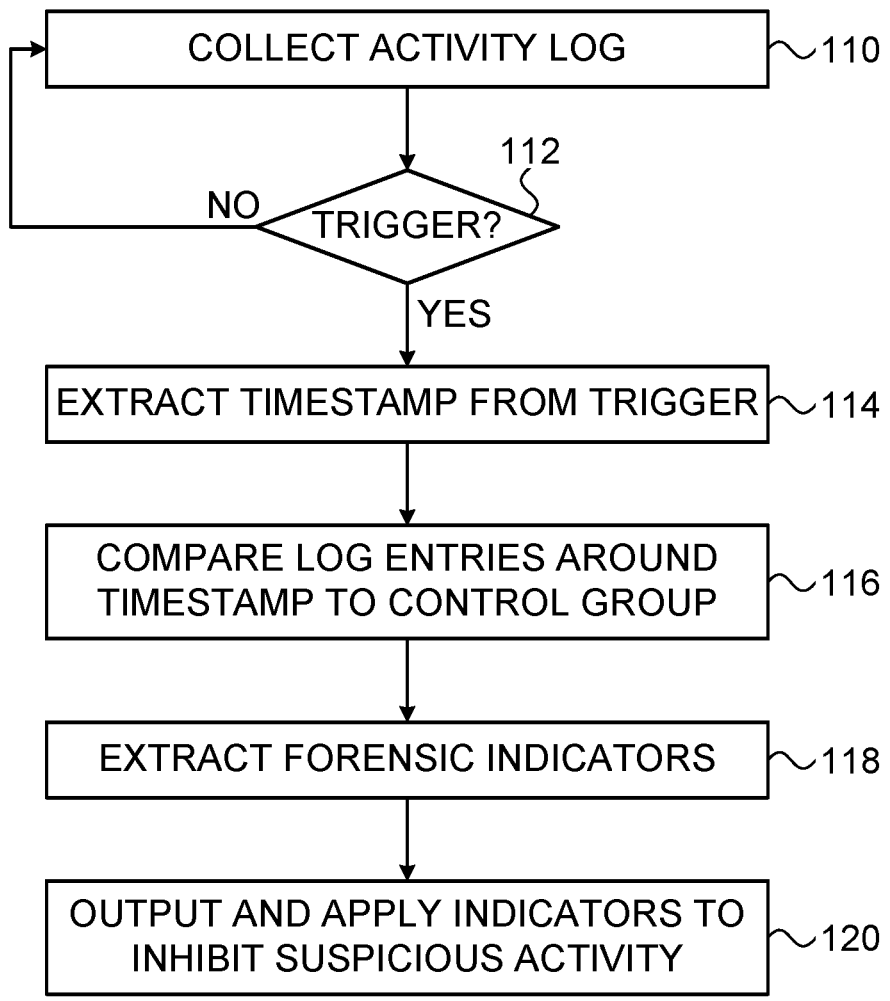

FIG. 6 is a flow chart that schematically illustrates a method for computer forensic analysis, in accordance with yet another embodiment of the present invention. This method makes use of activity logs 52 stored on host computers 26 and/or on log information 72 that is collected and stored by forensic analyzer 38, at a log collection step 110. Log information 72 may include not only copies of host activity logs 52, but also substantially any other logs generated in system 20, such as system event logs, system-wide application event logs, security logs, audit logs, application-specific logs, file system tables, and browsing histories.

The method of FIG. 6 makes use of the specific time of occurrence of a suspicious event detected by behavior monitor 34, at a triggering step 112. Forensic analyzer 38 extracts a timestamp from the trigger, at a timestamp extraction step 114, and applies this timestamp and log entries to generate indicators in the form of names and references of files and processes, as described in greater detail hereinbelow.

The present log-based method is thus useful when behavioral intelligence provided by behavior monitor 34 includes a series of specific timestamps and hosts, and particularly when suspicious behavior detected by the behavior monitor is associated with an abnormal event that occurred in or to the given hosts at or around a certain timestamp. For example, a timestamp of this sort may indicate the first time a host that may not be infected attempted to communicate with its suspected command and control server, and may thus point to the time at which the host was actually infected with the malware causing the communication. Log entries at and around this time can be analyzed to identify elements that were associated with the introduction of the suspicious behavior into the host in question and that may have taken part in the process of infecting the host. Log analysis may identify such elements even when they are no longer active, and even if they are no longer present on the host.

Based on the timestamp received in step 114, forensic analyzer 38 collects log entries from or regarding suspected hosts and compares the entries recorded within a predefined time interval of the timestamp, for example, five minutes before or after the timestamp, to a control group, at a log comparison step 116. The control group comprises log entries generated at a set of timestamps that are not suspected at all and may be randomly chosen. The control entries, in other words, reflect system activity at times that the anomalous behavior under investigation was presumably inactive. The forensic analyzer extracts and compares log entries in both the suspected and control groups in time intervals that typically extend both before and after the respective timestamps.

Based on the comparison at step 116, forensic analyzer 38 extracts and scores forensic features from the logs, at an indicator extraction step 118. Each feature is scored according the probability of its appearing near "suspicious timestamps" and not near the control group timestamps. The forensic features may include, for example:

Log density (number of log lines per timeframe),
Log severity profile (based on the ratio between "info" log lines and "warning" log lines), and
Event types.

The above analysis enables the forensic analyzer to compute a score for each log line, indicating the likelihood that the line in question is associated with the anomalous behavior that was detected. The forensic analyzer then extracts specific references to forensic indicators from the log lines that meet certain scoring criteria, such as the highest scoring log lines. These indicators may include identifiers, for example, filenames, paths, registry paths, process names, module names, application names, and e-mail GUIDS that appear in the log lines in question.

To define the operation of forensic analyzer 38 at steps 116 and 118 more formally, we denote as R the set of all references occurring in log lines within the chosen time interval around each suspicious timestamp t. For each such reference r to a forensic indicator in R and for each suspicious timestamp t in the suspicious timestamp set T, processor 60 checks whether r occurred within the predefined interval around t. Denoting the set of all suspicious timestamps around which the reference r occurred as $S_r$, processor 60 counts the ratio of appearance of r:

$$S_r = \frac{\#S_r}{\#R}.$$

In similar fashion, processor 60 checks occurrences of each reference r around timestamps belonging to the control group C, thus giving the ratio:

$$T_r = \frac{\#C_r}{C}.$$

References (r) with high $S_r$ and zero to small $C_r$ are considered to be related to the anomalous events that took place around the suspicious timestamps.

As in the preceding embodiments, forensic analyzer 38 typically outputs the indicators that it has found, at an output step 120, whereupon these indicators may then be applied in inhibiting the suspicious activity that was detected.

As an example of the operation of the present embodiment, assume behavior monitor 34 identifies a host that communicates on a daily basis with an HTTP server that has no reputation. The behavior monitor flags this behavior as suspicious, and the HTTP server is suspected of being a command and control server for active malware infecting the host. The behavior monitor is able, based on communication records, to pinpoint the second at which the suspicious host first communicated with the server in question. In many cases, this first communication with the command and control server will occur several seconds or minutes after the host has been infected. Therefore, behavior monitor 34 passes the timestamp of this first communication to forensic analyzer 38, which uses the above method to compare the log lines around this timestamp with log lines from random timestamps. The forensic analyzer extracts indicators of objects and entities that are referenced in the former group of log lines but not in the latter, on the assumption that these indicators are probably related to the infection process.

It will be appreciated that the embodiments described above are cited by way of example, and that the present invention is not limited to what has been particularly shown and described hereinabove. Rather, the scope of the present invention includes both combinations and subcombinations of the various features described hereinabove, as well as variations and modifications thereof which would occur to persons skilled in the art upon reading the foregoing description and which are not disclosed in the prior art.

The invention claimed is:

1. A method for computer system forensics, comprising:
receiving an identification of a plurality of host computers that exhibited an anomalous behavior, in a computer network comprising multiple host computers;
assembling a plurality of respective positive images of the identified plurality of host computers in the network using image information collected with regard to a configuration of software components running on the host computers;
assembling a plurality of negative images using image information collected with respect to a plurality of host computers not exhibiting the anomalous behavior;
making a comparison between the plurality of positive images and the plurality of negative images; and
based on the comparison, extracting from the positive and negative images a feature of the configuration of the software components that distinguishes between the positive and negative images, to serve as a forensic indicator of the anomalous behavior,
wherein extracting the feature comprises extracting a narrow feature, traversing a generalization path and determining whether generalizations on the path distinguish between the positive and negative images.

2. The method according to claim 1, wherein identifying the plurality of host computers comprises mapping respective suspiciousness levels of the host computers in the network, and initiating the comparison when the suspiciousness levels meet a predefined trigger condition.

3. The method according to claim 2, wherein the trigger condition comprises a cumulative trigger condition of the plurality of host computers.

4. The method according to claim 2, wherein the trigger condition initiates the comparison responsive to a single one of the plurality of host computers having a suspiciousness level above a threshold.

5. The method according to claim 1, wherein assembling the respective positive images comprises collecting the image information from the host computers periodically.

6. The method according to claim 1, wherein assembling the respective positive images comprises collecting the image information in response to identifying the plurality of host computers that exhibited the anomalous behavior.

7. The method according to claim 1, wherein the plurality of the negative images comprise at least one image of the at least one host computer, wherein the at least one image is assembled using the image information collected with respect to the at least one host computer prior to the anomalous behavior.

8. The method according to claim 1, wherein extracting the feature comprises finding a commonality of the positive images that is absent from the negative images.

9. The method according to claim 8, wherein finding the commonality comprises identifying a property that is matched exactly in all of the positive images.

10. The method according to claim 8, wherein finding the commonality comprises identifying a property of one of the positive images, and generalizing the property so that all of the positive images, but not the negative images, match the generalized property.

11. The method according to claim 1, wherein extracting the feature comprises identifying a property that occurs with a first probability in the positive images and occurs with a second probability, lower than the first probability, in the negative images.

12. The method according to claim 1, wherein extracting the feature comprises finding a commonality of the negative images that is absent from the positive images.

13. The method according to claim 1, wherein extracting the feature comprises providing an identification of at least one of a file and a directory that is associated with the anomalous behavior.

14. The method according to claim 13, wherein the images comprise a respective directory structure of each of the host computers, and wherein providing the identification comprises specifying a file in the directory structure that is manifest in the positive images but not in the negative images.

15. The method according to claim 13, wherein the images comprise a respective directory structure of each of the host computers, and wherein providing the identification comprises specifying a file in the directory structure that is manifest in the negative images but not in the positive images.

16. The method according to claim 13, wherein the images comprise a respective directory structure of each of the host computers, and wherein providing the identification comprises specifying a directory in the directory structure that is manifest in the positive images but not in the negative images.

17. The method according to claim 13, wherein the images comprise a respective directory structure of each of the host computers, and wherein providing the identification comprises specifying a directory in the directory structure that is manifest in the negative images but not in the positive images.

18. The method according to claim 1, and comprising applying the forensic indicator in checking the host computers on the network in order to inhibit further occurrence of the anomalous behavior.

19. The method according to claim 1, wherein assembling a plurality of positive and negative images comprises choosing a number of positive images and a number of negative images according to tolerances of false-positive and false-negative results set by a system operator.

20. The method according to claim 1, wherein extracting from the positive and negative images a feature of the configuration of the software components comprises extracting a plurality of features.

21. The method according to claim 20, wherein assembling a plurality of positive and negative images comprises choosing a number of positive images and a number of negative images according to tolerances set by a system operator and assembling the chosen numbers of positive and negative images.

22. The method according to claim 21, further comprising after extracting the plurality of features changing the number of positive or negative images and repeating the assembling of the positive and negative images for the changed number of images, the making of the comparison and the extracting of the plurality of features.

23. Apparatus for computer system forensics, comprising:
an interface, configured to receive an identification of a plurality of host computers that exhibited an anomalous behavior, in a computer network comprising multiple host computers; and
a hardware processor, which is configured to assemble a plurality of respective positive images of the identified plurality of host computers using image information collected with regard to a configuration of software components running on the host computers, to assemble a plurality of negative images using image information collected with respect to a plurality of host computers not exhibiting the anomalous behavior, to make a comparison between the plurality of positive images and the plurality of negative images, and based on the comparison, to extract from the positive and negative images a feature of the configuration of the software components that distinguishes between the positive and negative images, to serve as a forensic indicator of the anomalous behavior,
wherein the hardware processor is configured to extract the feature by extracting a narrow feature, traversing a generalization path and determining whether generalizations on the path distinguish between the positive and negative images.

24. The apparatus according to claim 23, wherein the hardware processor is configured to provide an identification of at least one of a file and a directory that is associated with the anomalous behavior.

25. The apparatus according to claim 23, wherein the hardware processor is configured to identify a property that occurs with a first probability in the positive images and occurs with a second probability, lower than the first probability, in the negative images.

26. A computer software product, comprising a non-transitory computer-readable medium in which program instructions are stored, which instructions, when read by a computer, cause the computer to receive an identification of a plurality of computers on a network that exhibited an anomalous behavior, to assemble a plurality of respective positive images of the identified plurality of host computers using image information collected with regard to a configuration of software components running on the host computers, to assemble a plurality of negative images using image information collected with respect to a plurality of host computers not exhibiting the anomalous behavior, to make a comparison between the plurality of positive images, and the plurality of negative images and based on the comparison, to extract from the positive and negative images a feature of the configuration of the software components that distinguishes between the positive and negative images, to serve as a forensic indicator of the anomalous behavior,
wherein the instructions cause the computer to extract the feature by extracting a narrow feature, traversing a generalization path and determining whether generalizations on the path distinguish between the positive and negative images.

\* \* \* \* \*